May 6, 1941. A. PLESMAN 2,241,155
METHOD AND MEANS FOR LAUNCHING AND LANDING AIRCRAFT
Filed Jan. 15, 1937 3 Sheets-Sheet 1
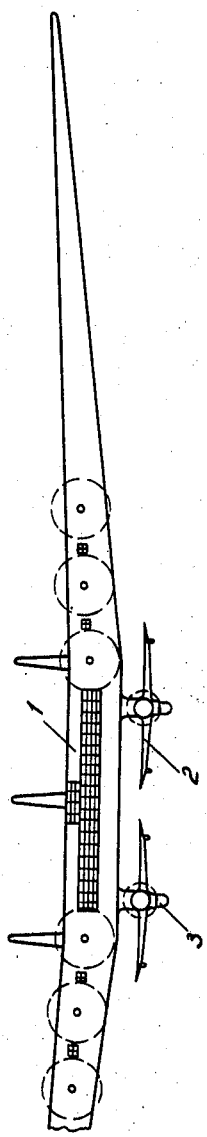
INVENTOR:
ALBERT PLESMAN
BY Haseltine Lake & Co.
ATTORNEYS May 6, 1941.  A. PLESMAN  2,241,155
METHOD AND MEANS FOR LAUNCHING AND LANDING AIRCRAFT
Filed Jan. 15, 1937  3 Sheets-Sheet 2
FIG: 2
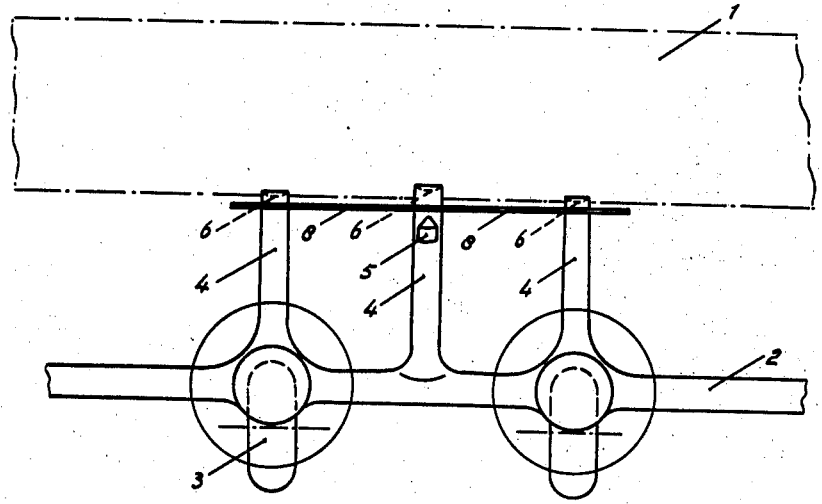
FIG: 4
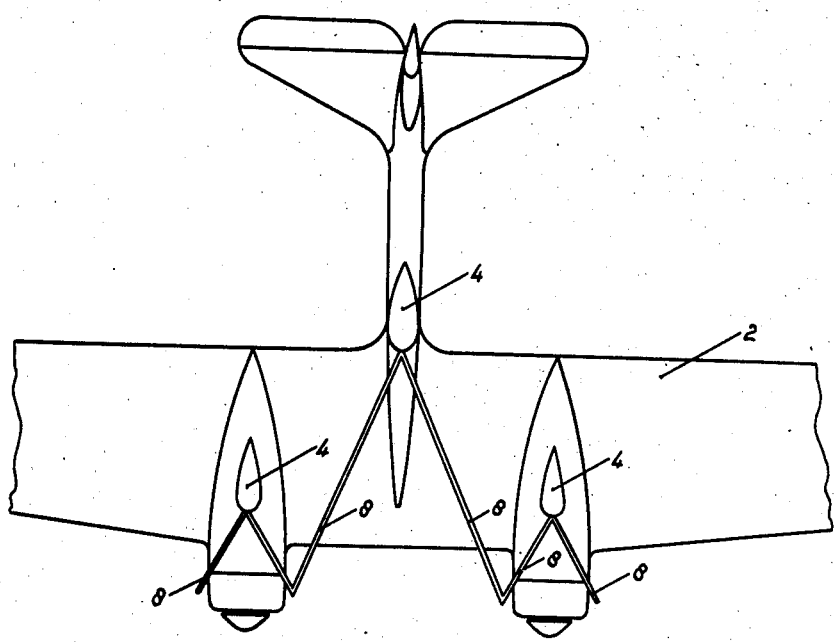
INVENTOR:
ALBERT PLESMAN
BY Haseltine, Lake & Co.
ATTORNEYS May 6, 1941.  A. PLESMAN  2,241,155
METHOD AND MEANS FOR LAUNCHING AND LANDING AIRCRAFT
Filed Jan. 15, 1937   3 Sheets-Sheet 3
FIG.:3
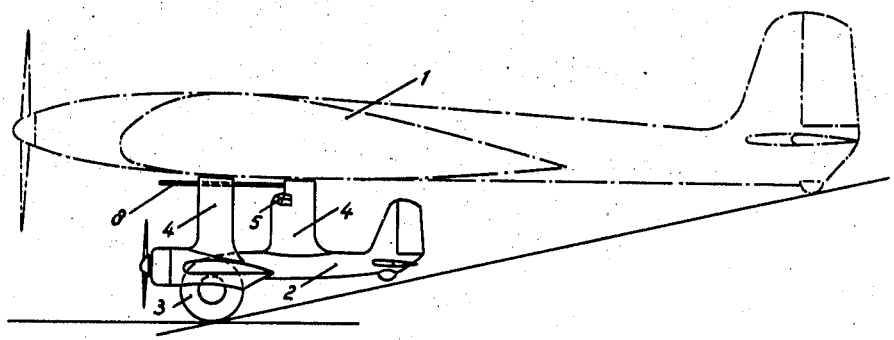
FIG.:5
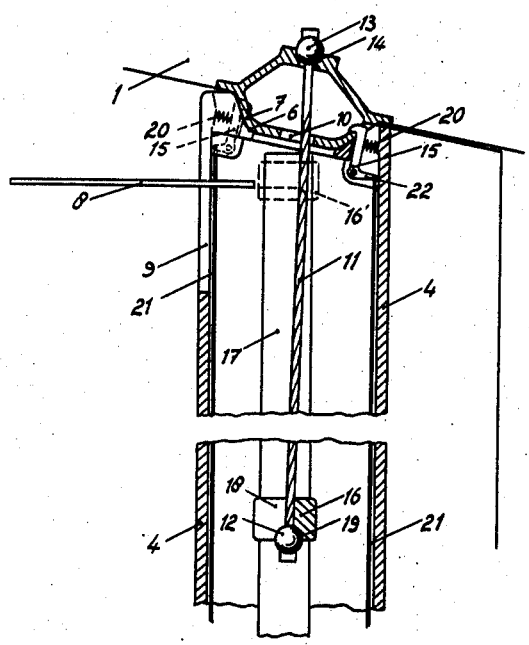
FIG.:6
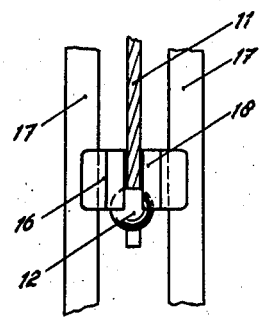
INVENTOR:
ALBERT PLESMAN
BY Haseltine Lake & Co.
ATTORNEYS Patented May 6, 1941

2,241,155

UNITED STATES PATENT OFFICE 2,241,155

METHOD AND MEANS FOR LAUNCHING AND LANDING AIRCRAFT

Albert Plesman, The Hague, Netherlands, assignor to Koninklijke Luchtvaart Maatschappij voor Nederland en Koloniën N. V., The Hague, Netherlands, a company of the Netherlands Application January 15, 1937, Serial No. 120,724
In the Netherlands January 21, 1936

13 Claims. (Cl. 244—2)

This invention relates to a method and means for launching, and landing of an aeroplane or other aircraft. The invention is based upon the knowledge that it is advantageous, particularly in the case of commercial aeroplanes which have to fly great distances without intermediate landing, not only to reduce to a minimum the harmful wind resistance offered by projecting parts of the aeroplane, but also to make the dead weight of the aeroplane as small as possible. This consideration has led to the knowledge that if in such aeroplanes the landing gear (or, in the case of sea-planes, the floats) could be eliminated, an improvement could be obtained both from the point of view of the wind resistance and also from the point of view of economy, owing to the reduction in the dead weight of the aeroplane. It is true that the retractable undercarriages which have so often been used recently take account of the requirements with regard to wind resistance, but they do not give the desired reduction in the dead weight of the aeroplane.

According to the present invention the above-mentioned two-fold advantage is obtained by using an aeroplane or other aircraft without means which enable an independent landing, i. e. without an under-carriage (or, in the case of a sea-plane, without floats) which aircraft when landing or during launching is supported by one or more auxiliary aircraft provided with landing gear, such as wheels, floats or the like built up of sufficient strength to support, in addition to the weight of the auxiliary craft, the weight of the chief craft.

The aeroplane is thus not provided with a fixed or retractable under-carriage or like landing gear, but when starting and landing uses the aid of the landing gears of one or more auxiliary aircraft. Aircraft constructed in this way can also be projected into the air by means of a catapult or in some other manner and, after it has made the required journey, be caught by one or more auxiliary aircraft in the manner described above.

Instead of themselves serving as the landing gear for the chief craft the auxiliary aeroplane or aeroplanes may carry a landing gear intended for the chief aircraft which is taken over by the latter in the air so that the chief aircraft can then land in the usual way. In this case also the object of the invention is attained inasmuch as during its flight the chief aircraft does not carry any landing gear so that the disadvantages attached thereto do not occur.

Thus in any case the invention enables the wind resistance otherwise created by the landing gear to be eliminated, whilst on the other hand, owing to the absence of this landing gear the dead weight of the aircraft is considerably reduced, whereby the economy of transport is improved.

Besides relating to the method outlined above, the invention concerns also the means for carrying the method into effect. The combination of aircraft for carrying out the first of the above-described methods may consist of a chief aircraft arranged on one or more auxiliary aircraft, which is or are each connected to the chief aircraft by connecting means adapted to be coupled up or uncoupled, both during the flight and also on the ground (or on the water). According to the invention, only the auxiliary aeroplane or aeroplanes is or are provided with landing gear, which are constructed so as to bear the weight of the chief aeroplane also.

The mutual coupling between the chief and auxiliary aeroplanes can be effected by the use of means already known for this purpose, such for example as one or more cables on the chief aeroplane which can be caught by fork-like engaging devices on the auxiliary aircraft whilst the chief aeroplane is in flight, after which the final coupling can be effected.

One or more auxiliary aircraft can be used at the place where the aeroplane starts and at the place where it lands. After the start has been made and the auxiliary aircraft (if used) have been uncoupled from the chief aircraft, the latter (which has no landing gear) flies on its own to its destination. When it arrives near the latter it is caught by and coupled to one or more auxiliary aircraft which flies or fly in the same direction as the chief aeroplane and a short distance below the same, so that in this way the chief aeroplane is equipped with landing gear. Thus equipped it can land safely at its destination.

It is known per se to launch an aeroplane in flight by using an auxiliary aeroplane which supports the aeroplane to be launched during the start and is coupled therewith by releasable locking means. Both these aeroplanes, however, are equipped with normal landing gear, and the chief aeroplane landed by means of its own ordinary landing gear. Consequently the two-fold advantage aimed at by the present invention, namely a decreased wind resistance and a smaller dead weight during flight thus producing a greater economy of transport, is not achieved.

In employing the invention in the manner first described above, flying landing gears are used, so to speak, which return to the base after the start of the zero plane whilst the latter continues on its way and when it arrives in the neighbourhood of its destination is caught by one or more of these flying landing gears, whereupon the landing takes place in safety.

The invention is illustrated schematically in the accompanying drawings, by means of an exemplary embodiment, in which—

Fig. 1 shows a commercial aeroplane supported by auxiliary aircraft according to the invention.

Fig. 2 is a detail view of a modified form of auxiliary aircraft.

Fig. 3 is a side view of the aircraft shown in Fig. 2 and shows also in dotted lines the main craft, supported by the auxiliary craft.

Fig. 4 is a plan view (in part) of the same aircraft.

Fig. 5 shows a longitudinal section through a part of the auxiliary craft and the main craft.

Fig. 6 shows a front view of a detail on enlarged scale.

Referring to the drawings the chief aeroplane (commercial aeroplane) is indicated by the reference 1. Any of the usual types of aeroplane can be used. The aeroplane is not equipped with the usual landing gear or under-carriage, and is connected by coupling devices described below with auxiliary aeroplanes 2 shown beneath the chief aeroplane. These auxiliary aeroplanes are each provided with an under-carriage 3 so constructed as to have the strength necessary for supporting the weight of the chief aeroplane during the starting and landing operations.

It may be preferred to make the engine power of the auxiliary aircraft greater than is necessary for ordinary use, in order to carry the chief aeroplane to the desired altitude in a shorter time when starting, or to give it the necessary speed.

The drawings show auxiliary aircraft which are constructed as aeroplanes or land planes. It needs no further explanation that alternatively sea-planes (e. g. flying boats) can be used without departing from the principle of the invention in any way.

Coupling and uncoupling of the main aircraft and the auxiliary aircraft may be effected in the following way:

On the auxiliary aircraft 2, shown in Figs. 2, 3, 4 and 5, three columns 4 are provided, two laterally at the front side and one in the middle at the back side. The column at the back may contain the cockpit 5, as shown in Figs. 2 and 3. Each of said columns is provided at its top part with a cup-shaped space 6; in said cup-shaped space a corresponding member 7, having an undersurface in the shape of a segment of a sphere, and forming a part of the main aircraft, engages, the said cup-shaped surface thus constituting a support for the main aircraft 1.

Each of the columns 4 is provided at its front side with a set of tentacles 8 (Fig. 4), whilst the front side of said columns is further provided with a longitudinal vertical slot 9 (Fig. 5). In the parts 7 openings 10 are provided in order to allow cables 11 to pass therethrough, each cable 11 having a weight 12 in the form of a sphere at its lower end and a stop member 13 in the form of a ball at its upper end, which in the lowered position of the cable rests on a cup-shaped surface 14 in the upper part of the member 7. The top parts of the columns 4 further contain a number of pawls 15, which automatically engage in co-acting slots in the members 7, as soon as the latter are brought into engagement with the cup-shaped surfaces 6 in the top part of the columns 4.

In the interior of each of the columns 4 a clamping part 16 is movable along vertical guides 17; said clamping part may be moved by means of a motor driven gear located in the auxiliary aircraft. The drawing (Fig. 6) shows a construction of said device according to which the clamping part 16 is guided between two parallel guide members 17. The latter e. g. may be constituted by screw spindles, which may be brought into rotation by a motor or by hand.

The clamping part is provided with a slot 18 to allow the cable 11 to pass and with a semi-spherical (cup-shaped) surface 19 for the weight 12 at the lower end of the cable.

In order to effect the coupling of the auxiliary aircraft 2 with the main aircraft 1, the auxiliary aeroplane will fly at a short distance below the main aircraft. The cables 11 of the main aircraft 1 must then be lowered; the auxiliary aircraft 2 will have to manoeuvre in such a manner that the cables will be caught between the tentacles 8 and will enter into the inside of the columns 4 through the slots 9. The cables thus will enter into the apertures 18 in the clamping parts 16. In this position the driving means will be brought into engagement with the motor or moved by hand, so that the clamping part 16 from its position at the top of the column (shown in Fig. 5 with dotted lines) will be moved into its lower position; at the same time the distance between the auxiliary aircraft and the main aircraft will be gradually decreased and in the end position the sphere segments on the under surface of the main craft will be in engagement with the cup-shaped spaces in the top of the columns 4. At this moment the pawls 15 by means of springs 20 will be moved into the position shown in Fig. 5, so that a rigid connection is obtained between both aircrafts and consequently the main aircraft is now in a condition to land together with the auxiliary aircraft as a whole, making use thereby of the landing device of the auxiliary aircraft.

The pawls 15 may be disengaged again simultaneously by means of a single handle or the like, acting on cables 21 connected with a lateral extension 22 of the pawls 15.

What I claim is:

1. The method of landing a main aircraft of the heavier than air type which consists in utilizing conventional flying gear with low wing load fixed thereto attaching in flight detachable flying landing gear thereto in the form of auxiliary aircraft capable of independent flight by utilizing conventional flying gear of relatively higher wing load as well as landing gear fixed on said auxiliary aircraft and thereby providing the main aircraft with exclusive supporting and landing gear, and proceeding to land with said flying landing gear attached to said main aircraft and supporting the latter out of contact with the ground upon the flying landing gear upon landing.

2. An aircraft launching and landing system, comprising the combination, of a main aircraft of the heavier than air type which is free from landing gear but provided with flying gear, at least one auxiliary aircraft provided with landing gear for the ground or water and with flying gear, and means for detachably connecting the main aircraft to and supporting the same upon the auxiliary aircraft during launching and landing operations.

3. In an aircraft launching and landing system according to claim 2, a catching and coupling means upon the lower portion of the main aircraft capable of being coupled to or uncoupled from the auxiliary aircraft or landing gear during flight.

4. In an aircraft launching and landing system according to claim 2, a catching and coupling means upon the lower portion of the auxiliary aircraft capable of catching and being coupled to the main aircraft, and means upon said auxiliary aircraft for supporting said main aircraft, said auxiliary aircraft being of sufficiently strong construction to carry at least part of the weight of said main aircraft in flight or when taking off or landing.

5. An aircraft launching and landing system according to claim 2, wherein the auxiliary aircraft virtually constitutes flying landing gear of such strong construction as to be capable of supporting at least part of the weight of the main aircraft.

6. An aircraft launching and landing system according to claim 2, wherein the auxiliary aircraft is provided with cup-shaped portions adapted to engage and connect with corresponding portions upon the main aircraft.

7. An aircraft launching and landing system according to claim 2, wherein the auxiliary aircraft is provided with cup-shaped portions and the main aircraft has corresponding spherical segment portions with which said cup-shaped portions are adapted to engage and connect in order to interconnect said main aircraft with said auxiliary aircraft.

8. An aircraft launching and landing system according to claim 2, wherein the auxiliary aircraft is provided with upwardly directed supporting columns for supporting the main aircraft thereon and with cup-shaped portions upon these columns adapted to engage and connect with corresponding portions upon the main aircraft, and wherein means are provided for initially drawing the main and auxiliary aircraft together in order to allow them to become interconnected.

9. An aircraft launching and landing system according to claim 2, wherein the auxiliary aircraft is provided with upwardly directed supporting columns for supporting the main aircraft thereon and with seating portions upon these columns adapted to engage and connect with corresponding portions upon the main aircraft, and wherein one or more pendent cables are provided upon the main aircraft and at least one of said columns is provided with means for catching said cable and is slotted upon the front portion in order to allow the cable when caught to pass into the interior of said column.

10. An aircraft launching and landing system according to claim 2, wherein the auxiliary aircraft is provided with cup-shaped portions adapted to engage and connect with corresponding portions upon the main aircraft, and wherein the auxiliary aircraft is provided with pivoted hooked pawls adapted to engage with and retain the main aircraft connected to the auxiliary aircraft when the main aircraft engages with said cup-shaped portions.

11. An aircraft launching and landing system according to claim 2, wherein the auxiliary aircraft is provided with cup-shaped portions and the main aircraft has corresponding spherical segment portions with which said cup-shaped portions are adapted to engage and connect in order to interconnect said main aircraft with said auxiliary aircraft, and wherein the auxiliary aircraft is provided with pivoted hooked pawls adapted to engage with and retain the main aircraft connected to the auxiliary aircraft when the main aircraft engages with said cup-shaped portions.

12. An aircraft launching and landing system according to claim 2, wherein the auxiliary aircraft is provided with upwardly directed supporting columns for supporting the main aircraft thereon and with seating portions upon these columns adapted to engage and connect with corresponding portions upon the main aircraft, and means for initially drawing the main and auxiliary aircraft together in order to allow them to become interconnected, and wherein the auxiliary aircraft is provided with pivoted hooked pawls adapted to engage with and retain the main aircraft connected to the auxiliary aircraft when the main aircraft engages with said seating portion.

13. An aircraft launching and landing system according to claim 2, wherein the auxiliary aircraft is provided with upwardly directed supporting columns for supporting the main aircraft thereon and with seating portions upon these columns adapted to engage and connect with corresponding portions upon the main aircraft, and means for initially drawing the main and auxiliary aircraft together in order to allow them to become interconnected, and wherein the auxiliary aircraft is provided with pivoted hooked pawls adapted to engage with and retain the main aircraft connected to the auxiliary aircraft when the main aircraft engages with said seating portions.

ALBERT PLESMAN.